United States Patent
Wong et al.

(10) Patent No.: US 11,010,755 B2
(45) Date of Patent: *May 18, 2021

(54) DEVICE PROVISIONING USING PARTIAL PERSONALIZATION SCRIPTS

(71) Applicant: Visa International Service Association, San Francisco, CA (US)

(72) Inventors: Erick Wong, Vancouver (CA); Oleg Makhotin, Paris (FR)

(73) Assignee: Visa International Service Association, San Francisco, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/255,559

(22) Filed: Jan. 23, 2019

(65) Prior Publication Data

US 2019/0156331 A1    May 23, 2019

Related U.S. Application Data

(63) Continuation of application No. 15/658,897, filed on Jul. 25, 2017, now Pat. No. 10,235,670, which is a
(Continued)

(51) Int. Cl.
*G06Q 20/32* (2012.01)
*G06Q 20/34* (2012.01)
(Continued)

(52) U.S. Cl.
CPC ....... *G06Q 20/363* (2013.01); *G06Q 20/3227* (2013.01); *G06Q 20/3278* (2013.01);
(Continued)

(58) Field of Classification Search
CPC ............. G06Q 20/363; G06Q 20/3227; G06Q 20/3278; G06Q 20/354; G06Q 20/3552; G06Q 20/38215; G06Q 20/3829
See application file for complete search history.

(56) References Cited

U.S. PATENT DOCUMENTS 7,469,151 B2  12/2008 Khan et al.
9,195,984 B1 * 11/2015 Spector ................ G06Q 20/322
(Continued)

OTHER PUBLICATIONS

U.S. Appl. No. 14/275,404 , "Non-Final Office Action", dated Jan. 12, 2017, 19 pages.
(Continued)

*Primary Examiner* — Noura Zoubair
(74) *Attorney, Agent, or Firm* — Kilpatrick Townsend & Stockton LLP

(57) ABSTRACT

Embodiments of the invention relate to systems and methods for efficiently provisioning mobile devices with personalization data. For some embodiments, a method is disclosed comprising receiving a request for provisioning comprising device information for a mobile device and user authentication information for a user, generating a partial personalization script, an activation script, and a deletion script using the device information, sending the partial personalization script, the activation script, and the deletion script to an application provider computer, wherein the application provider computer initiates execution of the partial personalization script on the mobile device, authenticating the user authentication information, and sending an activation message to the application provider computer, wherein the application provider computer initiates execution of the activation script.

17 Claims, 10 Drawing Sheets

Related U.S. Application Data continuation of application No. 14/275,404, filed on May 12, 2014, now Pat. No. 9,760,886.

(60) Provisional application No. 61/822,271, filed on May 10, 2013, provisional application No. 61/898,428, filed on Oct. 31, 2013.

(51) Int. Cl.
  *G06Q 20/36* (2012.01)
  *G06Q 20/38* (2012.01)

(52) U.S. Cl.
  CPC ....... *G06Q 20/354* (2013.01); *G06Q 20/3552* (2013.01); *G06Q 20/3829* (2013.01); *G06Q 20/38215* (2013.01)

(56) References Cited

U.S. PATENT DOCUMENTS

| | | | |
|---|---|---|---|
| 2005/0044393 A1* | 2/2005 | Holdsworth | H04L 9/3231 726/26 |
| 2009/0298468 A1 | 12/2009 | Hsu | |
| 2012/0078735 A1 | 3/2012 | Bauer et al. | |
| 2012/0143772 A1* | 6/2012 | Abadir | G06Q 20/401 705/75 |
| 2012/0202462 A1* | 8/2012 | Sudhakar | H04W 4/60 455/411 |
| 2013/0054474 A1* | 2/2013 | Yeager | G06Q 20/02 705/71 |
| 2013/0111599 A1 | 5/2013 | Gargiulo et al. | |
| 2013/0151400 A1 | 6/2013 | Makhotin | |
| 2013/0232083 A1* | 9/2013 | Smith | G06Q 20/355 705/67 |
| 2013/0262302 A1 | 10/2013 | Lettow et al. | |

OTHER PUBLICATIONS

U.S. Appl. No. 14/275,404 , "Notice of Allowance", dated Apr. 25, 2017, 15 Pages.

U.S. Appl. No. 15/658,897 , "Notice of Allowance", dated Oct. 24, 2018, 13 pages.

\* cited by examiner

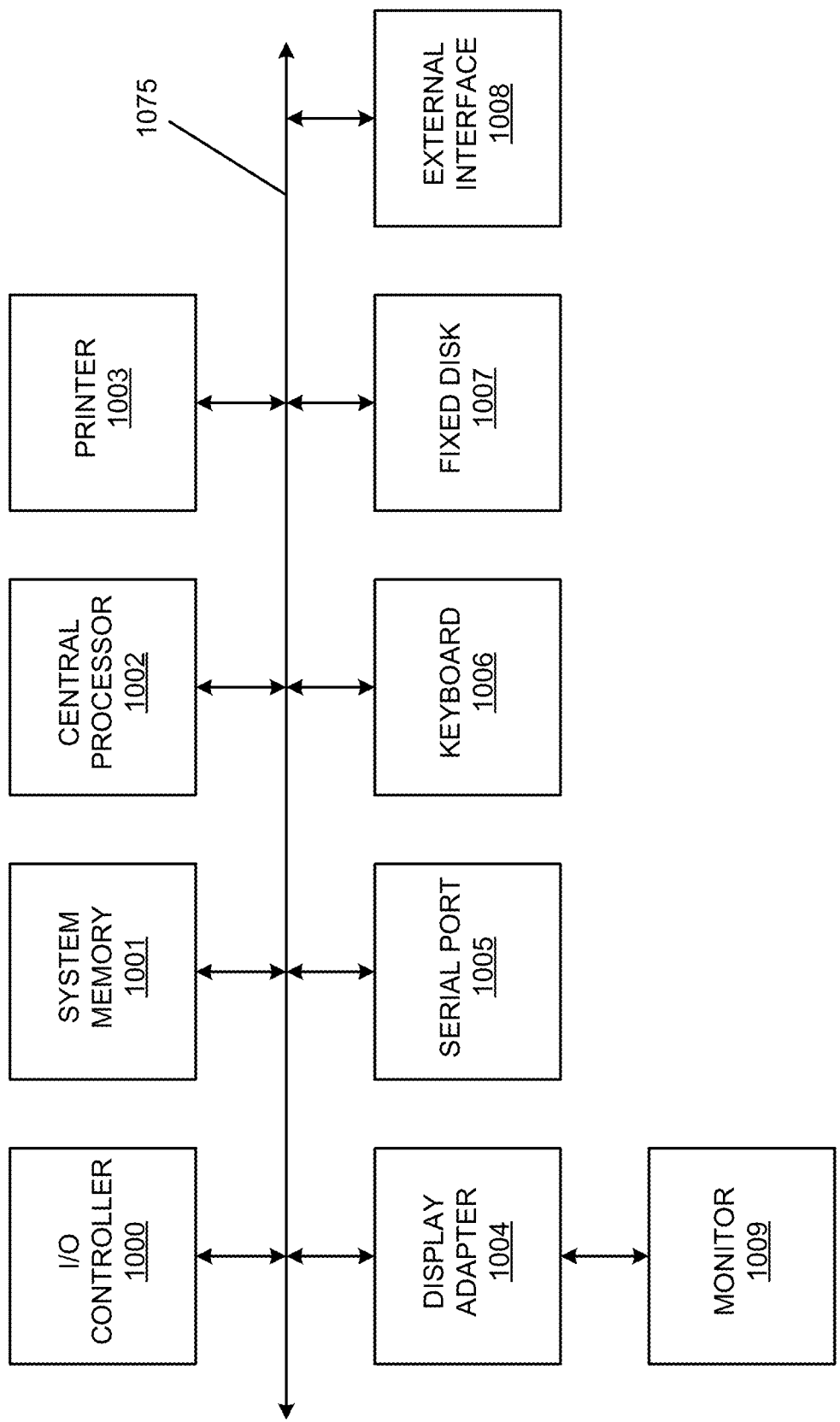

DEVICE PROVISIONING USING PARTIAL PERSONALIZATION SCRIPTS

CROSS-REFERENCES TO RELATED APPLICATIONS

The present application is a continuation of U.S. application Ser. No. 15/658,897 filed Jul. 25, 2017, which is a continuation of U.S. application Ser. No. 14/275,404 filed May 12, 2014, which is a non-provisional application of and claims priority to U.S. Provisional Application No. 61/822,271 filed on May 10, 2013 and U.S. Provisional Application No. 61/898,428, filed on Oct. 31, 2013, the entire contents of all of which are herein incorporated by reference for all purposes.

BACKGROUND

Mobile payment using a digital wallet is an increasingly common method of conducting a payment transaction. However, before a mobile device is able to conduct a transaction, the mobile device typically needs to be provisioned with personalization data relating to a user and/or account.

Provisioning a mobile device may involve authenticating a user and storing personalization data onto the mobile device. Some systems and methods for provisioning a portable electronic device are disclosed in U.S. Patent Publication No. 2012/0078735 to Bauer et al. (hereinafter "Bauer"). In Bauer, provisioning is generally performed by (1) storing payment account data in a mobile handset, (2) once the payment account data is stored, authenticating a user, and (3) activating the payment account if authentication is successful.

However, prior systems such as Bauer have a number of shortcomings that cause device provisioning to be slow and inefficient. For example, in Bauer, the authentication process cannot begin until mobile payment account data is created, prepared, encrypted, and stored on a mobile handset. This causes inconvenience for the user (e.g., due to wait times) and increases the amount of time a server must store provisioning information for a device in memory, increasing computational load. In addition, after a user is authenticated, Bauer requires the generation of an unblock command for the payment account data and several messages to be exchanged between a middleware server and the mobile handset, further increasing the latency of the process.

Embodiments of the present invention address these and other problems individually and collectively.

BRIEF SUMMARY

Embodiments of the invention relate to systems and methods for efficiently provisioning mobile devices with personalization data.

One embodiment discloses a method comprising receiving a request for provisioning comprising device information for a mobile device and user authentication information for a user, generating a partial personalization script, an activation script, and a deletion script using the device information, sending the partial personalization script, the activation script, and the deletion script to an application provider computer, wherein the application provider computer initiates execution of the partial personalization script on the mobile device, authenticating the user authentication information, and sending an activation message to the application provider computer, wherein the application provider computer initiates execution of the activation script.

One embodiment of the invention discloses a server computer. The server computer comprises a processor and a non-transitory computer-readable storage medium, comprising code executable by the processor for implementing a method comprising receiving a request for provisioning comprising device information for a mobile device and user authentication information for a user, generating a partial personalization script, an activation script, and a deletion script using the device information, sending the partial personalization script, the activation script, and the deletion script to an application provider computer, wherein the application provider computer initiates execution of the partial personalization script on the mobile device, authenticating the user authentication information, and sending an activation message to the application provider computer, wherein the application provider computer initiates execution of the activation script.

One embodiment of the invention discloses a server computer. The server computer comprises a processor and a non-transitory computer-readable storage medium, comprising code executable by the processor for implementing a method comprising sending a request for provisioning comprising device information for a mobile device and user authentication information for a user, wherein the user is authenticated using the user authentication information, receiving a partial personalization script, an activation script, and a deletion script based on the request for provisioning, initiating execution of the partial personalization script on the mobile device, receiving an activation message, and initiating execution of the activation script on the mobile device.

BRIEF DESCRIPTION OF DRAWINGS

FIG. 10 shows a block diagram of a computer apparatus.

DETAILED DESCRIPTION

Figure 1:
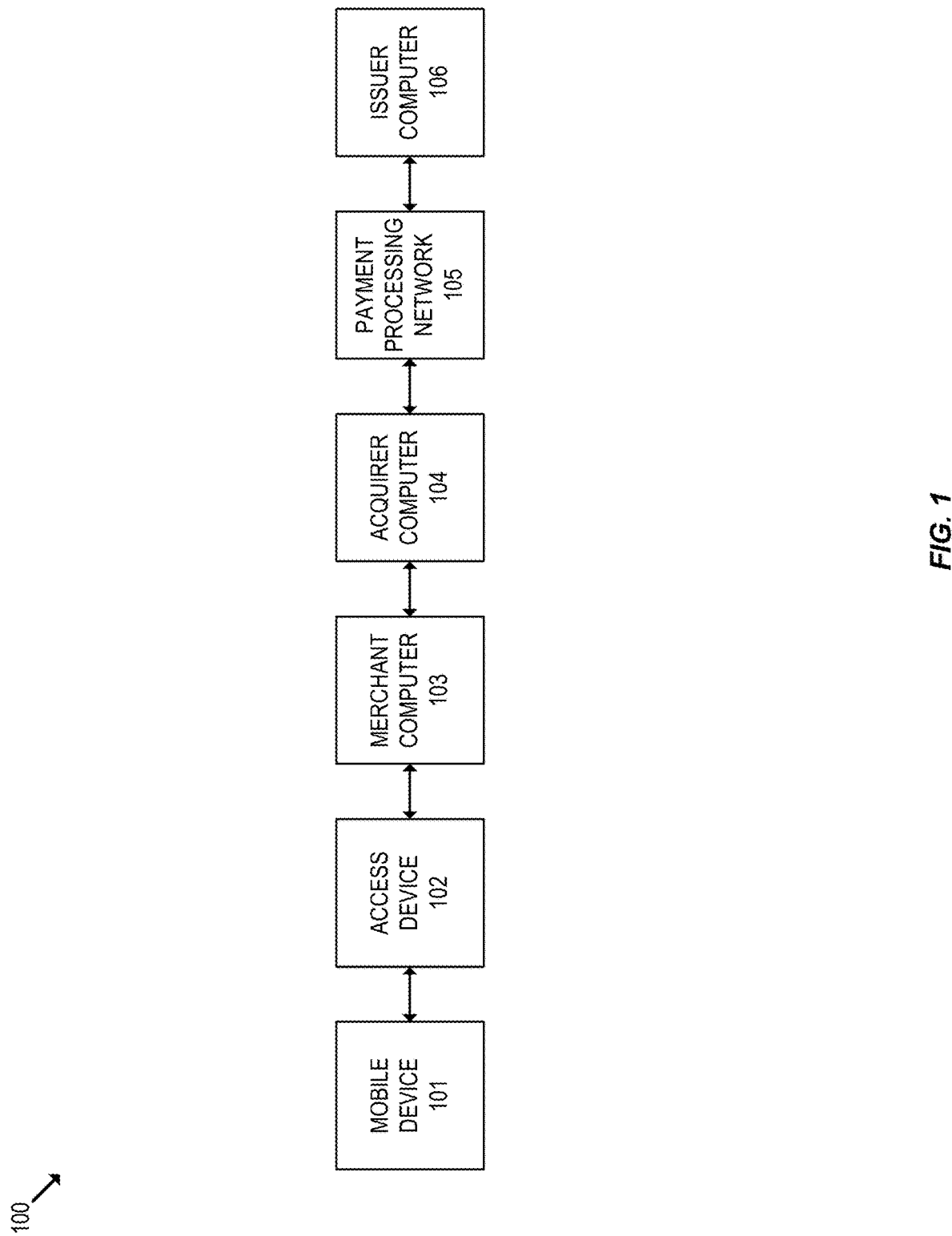
FIG. 1 shows an example of a system that may be used to conduct payment transactions.

Embodiments of the invention relate to systems and methods for efficiently provisioning mobile devices with personalization data.

For some embodiments, a process for provisioning a mobile device is disclosed. In some such embodiments, three scripts may be generated by a service provider computer: a partial personalization script, an activation script, and a deletion script. The partial personalization script may be operable to store personalization data on a mobile device. The activation script may be operable to make the personalization data stored by the partial personalization script activated. The deletion script may be operable to delete the partial personalization data.

The partial personalization script may be generated and executed on the mobile device concurrently with a user authentication process initiated by the service provider computer. For example, as the partial personalization script is executed, a user may be prompted to enter authentication information (e.g., answers to a series of authentication questions) into the mobile device. If authentication is successful, the activation script may be executed to enable access to the personalization data. However, if authentication is unsuccessful, the deletion script may be executed to remove the personalization data from the mobile device. Typically, both the activation script and deletion script may be significantly faster to execute than the partial personalization script. Thus, embodiments enable the fast and efficient provisioning of personalization data onto a mobile device.

Prior to further description of embodiments of the invention, description of some terms may be helpful in understanding embodiments of the invention.

The term "provisioning" may include may process for preparing a device for a new function or feature, such as to enable use of an application (e.g., a payment application). For example, provisioning a mobile application may comprise authenticating a user or device and storing personalization data relating to the application on a mobile device. In some cases, provisioning may involve storing data to specific locations. For example, provisioning may involve storing data on a secure element (SE) of a mobile device and making it accessible to applications.

A "mobile application" may include any application, app, program, or other software usable by a mobile device. Examples of mobile applications may include digital wallet applications, contactless payment application, e-commerce applications, word processors, media players, etc.

The term "personalization data" may include any data specifically relating to a user, person, account, device, application or another entity. In some cases, personalization data may be necessary in order for an application to function. For example, in a mobile wallet application, personalization data may include various payment information, such as a user's name, a primary account number (PAN), a payment account expiration date, etc.

A "provisioning script" may include may include any source code, machine code, executable file, or other instructions operable to provision a device or assist in the provisioning of a device. A provisioning script may be written in any suitable programming language, such as C, C++, Java, Python, or assembly. In some cases, the provisioning script may include specific calls or commands to hardware elements. For example, if an EMV card or mobile device is being provisioned, a provisioning script may operate according to "EMV Card Personalization Specification version 1.0.," which defines commands that may be used to provision an EMV smart card. In some cases, a provisioning script may comprise personalization data in addition to instructions operable to provision the personalization data.

A "partial personalization script" may include a provisioning script operable to store personalization data on a mobile device. In some cases, the partial personalization script may store the personalization data onto the device in a protected or inaccessible form. For example, the personalization data may be stored in a secure element, such as a hardware security module (HSM), so that a mobile operating system and mobile applications are unable to access the personalization data. In some cases, the partial personalization script may store the personalization data onto the device in encrypted form, so that the personalization data is similarly inaccessible to unauthorized parties. Typically, personalization data included in the partial personalization script may be encrypted, so that an unscrupulous party would not be able to reverse engineer the partial personalization script to determine personalization data. Typically, the partial personalization script would be different for each provisioning process.

An "activation script" may include a provisioning script operable to enable access to or otherwise activate personalization data stored on a device using a partial personalization script. For example, if the partial personalization script stored the personalization data on a secure element, the activation script may be operable to disable a protection flag set on the data in the secure element to allow a mobile operating systems and/or mobile applications to access the personalization data. If the partial personalization script stored the personalization data in an encrypted format, then the activation script may include a decryption key or may be otherwise operable to decrypt the personalization data. Typically, the activation script may be structured to require the least amount of memory and computing time to execute, so that the personalization data may be made accessible substantially immediately after the activation script is executed. Similarly to the partial personalization script, the activation script is typically different for each provisioning process.

A "deletion script" may include a provisioning script operable to delete or otherwise remove personalization data stored by a partial personalization script. For example, if the partial personalization script stored the personalization data as an encrypted file or a file in a secure element, the deletion script may be operable to delete the file. As with the partial personalization script and activation script, the deletion script is typically different for each provisioning process.

An "application provider computer" may be a server computer or another computing device operated by or on behalf of an application provider. An application provider may be any entity that provides an application to a user. One example of an application provider may be a digital wallet provider (e.g., Google™ Wallet, or Visa V.Me™). The digital wallet provider may maintain digital wallets for users, each digital wallet comprising payment data for one or more payment accounts.

A "service provider computer" may be a server computer or another computing device operated by or on behalf of a service provider. A service provider may be any entity that provides provisioning or personalization services. For example, a service provider computer may maintain a personalization database with information about users, and may be configured to communicate with one or more issuers to determine personalized payment data for users. The service provider compute may provide "provisioning as a service" to one or more application provider computers, wherein the application provider computers utilize an application programming interface (API) to communicate with a service provider computer.

Embodiments of the invention provide several advantages. For example, embodiments allow the provisioning of a mobile device to be performed quickly. Determining, transmitting, and storing personalization data on a mobile device may take a significant amount of time, as may authentication of a user. Whereas determination of provisioning data, generation of one or more provisioning scripts, and execution of the provisioning scripts are typically compute bound, authentication is often bound by user input time.

Thus, by parallelizing provisioning in the manner described for embodiments, the time taken to determine, transmit, and store personalization data can be masked by the time taken to authenticate the user. For example, if authentication of the user is completed after execution of the partial personalization script, activation of the personalization data to complete provisioning may be performed substantially immediately after authentication is completed. Thus, user wait time is minimal to none. Even if storing the personalized data is completed after user authentication, the amount of time a user has to wait before the provisioning is completed is reduced. Thus, embodiments reduce the total time to provision a mobile device and improve user experience.

Embodiments of the invention provide the further advantage of separating provisioning tasks between a service provider computer and an application provider computer. Due to the sensitive nature of data (e.g., personally identifiable information and payment account information for many users) handled by a service provider computer, it is desirable to limit the trusted computing base (TCB) of service provider computers. Limiting the TCB of service provider computers may involve limiting the number and functionality of the service provider computers. Thus, the efficiency of each service provider computer is an important concern.

By generating a partial provisioning script, activation script, and deletion script, and sending the scripts to an application provider computer, embodiments limit the substantial processing at a service provider computer to provision a mobile device to a short period of time. Once the scripts are generated and transmitted, the majority of computing state relating to the mobile device (including personalized data) can be removed from the service provider computer, reducing memory requirements and limiting vulnerability in the event of a compromise. For example, embodiments reduce exposure to attacks that reveal system memory, such as the OpenSSL Heartbleed bug. In addition, reducing the memory required to provision a device increases the number of devices that can be provisioned concurrently on a server.

Later, when the service provider computer receives an indication that partial personalization and user authentication for a mobile device are complete, the service provider computer can send a generic activation message to the application provider computer that does not require specific personalized data. Therefore, even though some of the computational work performed by the service provider computer is guaranteed to be wasted (i.e., either the activation script or the deletion script will never be run), by generating all three scripts at once, embodiments improve the scalability and security of the provisioning system.

The above examples highlight only a few of the advantages of provisioning a mobile device in accordance with embodiments of the invention.

I. Payment Systems

FIG. 1 shows a system used to conduct a payment transaction according to an embodiment of the invention. The system comprises a user (not shown) who may operate a mobile device 101. The user may use mobile device 101 to conduct purchase transactions at an access device 102 connected to a merchant computer 103. Merchant computer 103 may be connected to acquirer computer 104. Acquirer computer 104 may be connected to issuer computer 106 via a payment processing network 105.

As used herein, an "issuer" may typically refer to a business entity (e.g., a bank) that maintains financial accounts for a user and may issues a payment credentials stored on mobile device 101, such as a cellular telephone, smart card, tablet, or laptop, to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities (e.g., merchant computer 103, acquirer computer 104, payment processing network 105, and issuer computer 106) may comprise one or more computer apparatuses to enable communications or to perform one or more of the functions described herein.

The payment processing network 105 may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, digital wallet transactions, and other types of commercial transactions. VisaNet™, in particular, includes a VIP system (Visa Integrated Payments system) which processes authorization requests and a Base II system which performs clearing and settlement services. In some embodiments, payment processing network 105 may conduct transactions in substantially real-time.

The payment processing network 105 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 105 may use any suitable wired or wireless network, including the Internet.

In a typical purchase transaction, the user purchases a good or service at merchant 103 using a mobile device 101 (e.g., a mobile phone). The user's mobile device 101 can interact with an access device 102 at a merchant associated with merchant computer 103. For example, the user may tap the mobile device 101 against an NFC reader in the access device 102. Alternatively, the user may indicate payment details to the merchant electronically, such using a digital wallet or in an online transaction.

An authorization request message is generated by the access device 102 and is then forwarded to the acquirer computer 104. Typically, the authorization request message will include a field for a primary account number (PAN) associated with the mobile device 101. After receiving the authorization request message, the authorization request message is then sent to the payment processing network 105. The payment processing network 105 then forwards the authorization request message to the corresponding issuer computer 106 associated with the issuer of the user's account. The PAN included in the authorization request message may be used to route the message to the appropriate issuer computer 106.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device (e.g., a mobile device) or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 105 receives the authorization request message, the issuer computer 105 sends an authorization response message back to the payment processing network 200 to indicate whether or not the current transaction is authorized (or not authorized). The payment processing network 200 then forwards the authorization response message back to the acquirer 104. The acquirer 104 then sends the response message back to the merchant computer 103. In some embodiments, such as when a fraud rule is triggered at payment processing network 200, payment processing network 200 may decline a transaction previously authorized by issuer computer 105.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

After the merchant computer 103 receives the authorization response message, the access device at the merchant computer 103 may then provide the authorization response message for the user. The response message may be displayed by the contactless access device, or may be printed out on a receipt. Alternately, if the transaction is an online transaction, the merchant may provide a web page or other indication of the authorization response message.

At the end of the day, a normal clearing and settlement process can be conducted by the payment processing network 105. A clearing process is a process of exchanging financial details between and acquirer and an issuer to facilitate posting to a user's payment account and reconciliation of the user's settlement position. However, it should be noted that embodiments of the invention are not limited to a single settlement process.

II. Provisioning Systems

In order for mobile device 101 to be used to conduct a payment transaction, mobile device 101 may need to be first provisioned with personalization data, such as payment information and information regarding a user.

Figure 2:
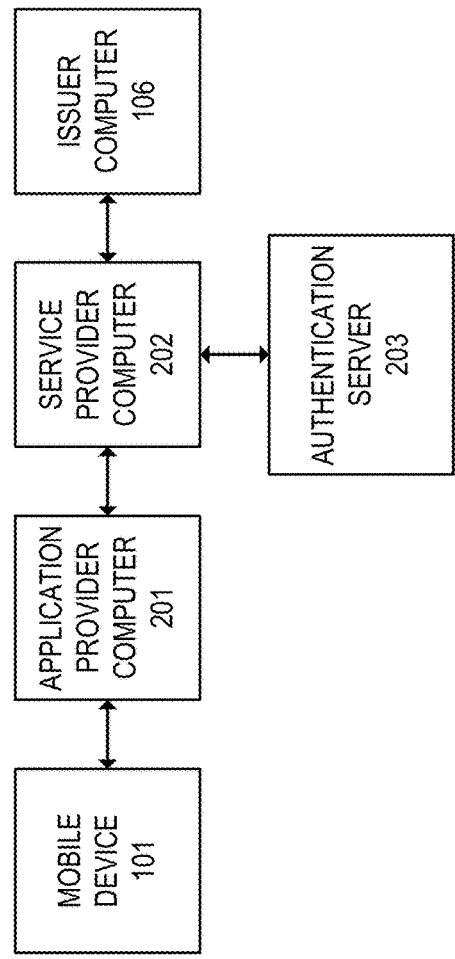
FIG. 2 shows an example of a system that may be used to conduct device provisioning.

FIG. 2 shows an example of a system 200 that may be used to conduct device provisioning according to some embodiments of the invention. System 200 comprises mobile device 101, an application provider computer 201, a service provider computer 202, an authentication server 203, and an issuer computer 106. Each of computers 201, 202, and 106 may be implemented using one or more computing devices such as server computers.

Application provider computer 201 may be a server computer or another computing device operated by or on behalf of an application provider. An application provider may be any entity that provides an application to a user. One example of an application provider may be a digital wallet provider (e.g., Visa V.Me™ or Google™ Wallet). The digital wallet provider may maintain digital wallets for users, each digital wallet comprising payment data for one or more payment accounts. An application provider may be associated with an application installed on mobile device 101. For example, a V.me application on mobile device 101 may be configured to connect to an application provider computer operated by Visa.

Service provider computer 202 may be a server computer or another computing device operated by or on behalf of a service provider. A service provider may be any entity that provides provisioning or personalization services. For example, a service provider computer may maintain a personalization database with information about users, and may be configured to communicate with one or more issuers to determine personalized payment data for users. The service provider compute may provide "provisioning as a service" to one or more application provider computers, wherein the application provider computers utilize an application programming interface (API) to communicate with a service provider computer.

Authentication server 203 may be a server computer or another computing device that provides authentication services to service provider 202. For example, authentication server 203 may be an entity that verifies user authentication information. In various embodiments, authentication server 203 may be associated with an issuer, payment processing network, or another entity.

In some embodiments, issuer computer 106 may provide to service provider computer 202 personal information regarding users associated with issuer computer 106. For example, issuer computer 106 may provide payment information, user information, account information, etc. In some embodiments, service provider computer 202 may provide to issuer computer 106 data relating to the provisioning process. For example, if during the provisioning process a payment token was generated for a user's account, the payment token may be provided to the account's issuer by service provider computer 202.

In one use case of system 200, a user may operate mobile device 101 to initiate a request for provisioning of a mobile application (e.g., a digital wallet application). The request for provisioning may be sent to application provider computer 201. Application provider computer 201 may forward the request to service provider computer 202. Service provider computer 202 may generate provisioning scripts (e.g., a partial personalization script, an activation script, and a deletion script) using personalization data determined from issuer computer 106 and/or one or more databases, and transmit the scripts to application provider computer 201. Application provider computer 201 may then initiate execution of a partial personalization script on mobile device 101.

Concurrently, service provider computer 202 may authenticate the user. Once the partial provisioning script has been executed and the user has been authenticated, service provider computer 202 may instruct application provider computer 201 to execute an activation script on mobile device 101 to complete provisioning.

It should be noted that any of computers 201-203 may be operated by or otherwise associated with the same entity as computer 103-106. For example, in one embodiment, service provider computer 202 may be operated by payment processing network 105.

Figure 3:
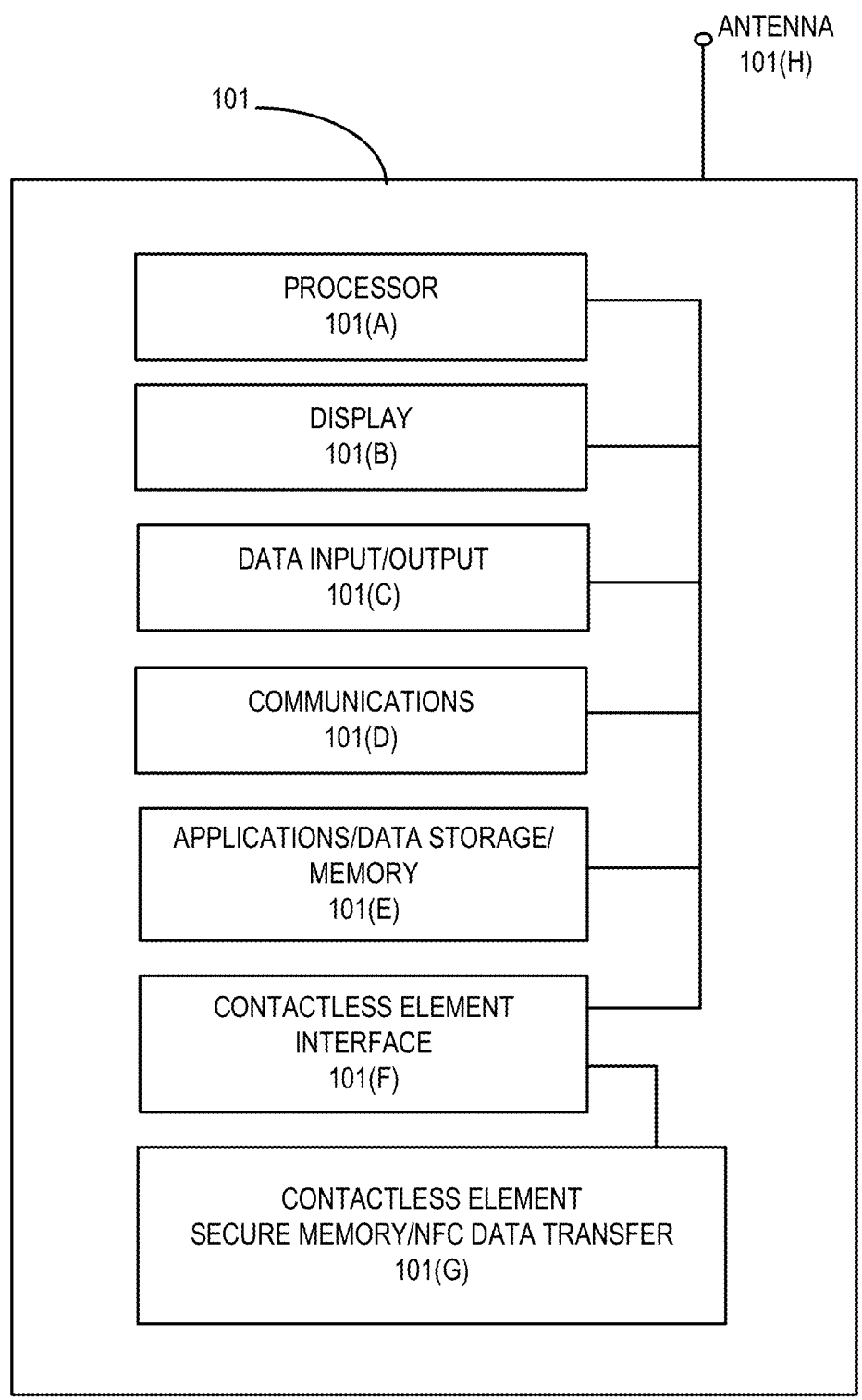
FIG. 3 shows an example of a mobile device according to some embodiments of the invention.

FIG. 3 shows an example of a mobile device according to some embodiments of the invention. Mobile device 101 may include circuitry that is used to enable certain device functions, such as telephony. The functional elements responsible for enabling those functions may include a processor 101(A) that is programmed to execute instructions that implement the functions and operations of the device. Processor 101(A) may access data storage 101(E) (or another suitable memory region or element) to retrieve instructions or data used in executing the instructions, such as provisioning scripts and mobile applications. Data input/output elements 101(C), such as a keyboard or touchscreen, may be used to enable a user to operate the mobile device 101 and input data (e.g., user authentication data). Data input/output elements may also be configured to output data (via a speaker, for example). Display 101(B) may also be used to output data to a user. Communications element 101(D) may be used to enable data transfer between mobile device 101 and a wired or wireless network (via antenna 101(H), for example) to assist in connectivity to the Internet or other network, and enabling data transfer functions. Mobile device 101 may also include contactless element interface 101(F) to enable data transfer between contactless element 101(G) and other elements of the device, where contactless element 101(G) may include a secure memory and a near field communications data transfer element (or another form of short range communications technology). As noted, a cellular phone or similar device is an example of a mobile device 101 that may be used to provisioned in accordance with embodiments of the present invention. However, other forms or types of devices may be used without departing from the underlying concepts of the invention. Further, devices that are provisioned may not require the capability to communicate using a cellular network in order to be suitable for use with embodiments of the present invention.

Figure 4:
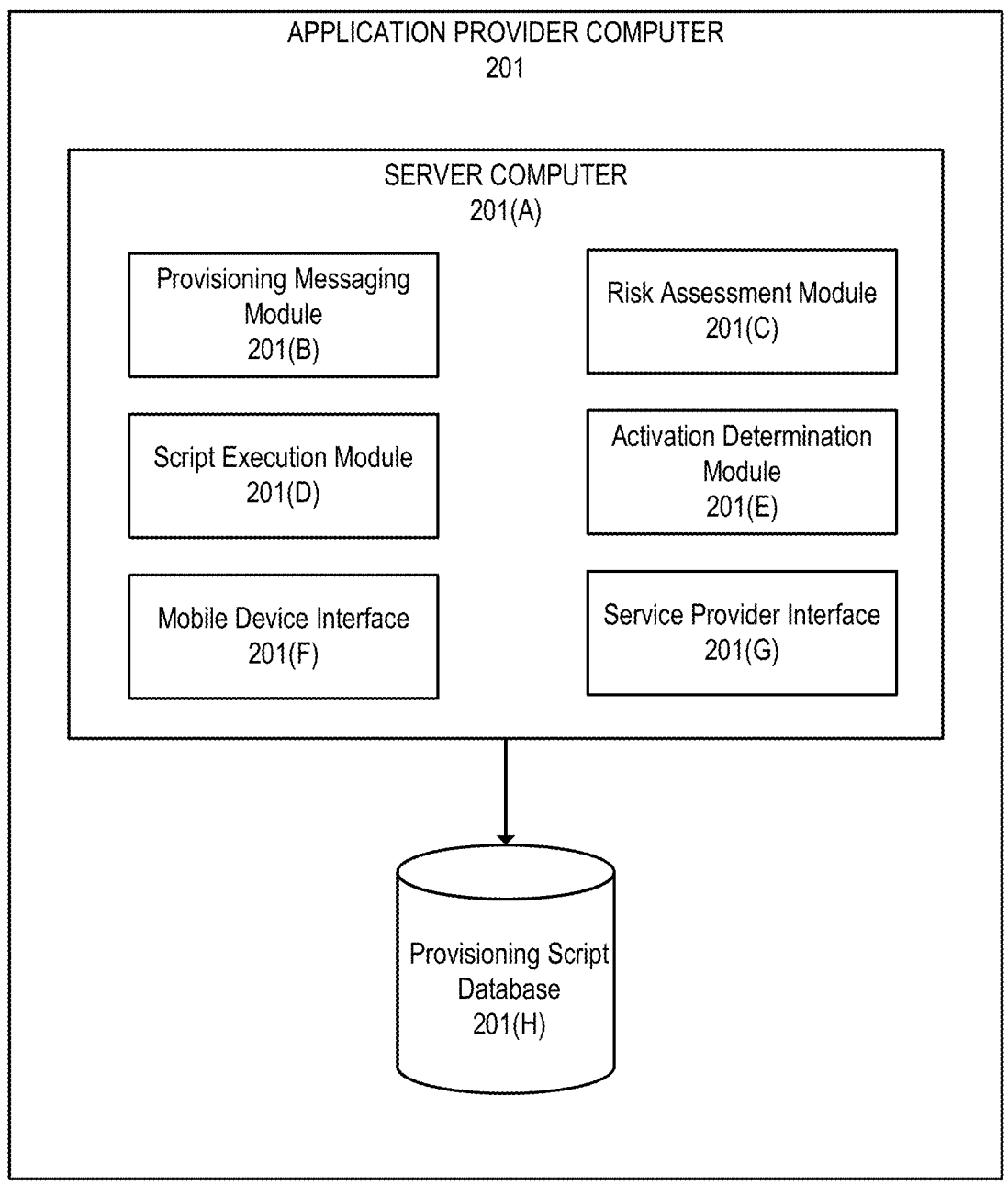
FIG. 4 shows an example of an application provider computer according to some embodiments of the invention.

FIG. 4 shows an example of an application provider computer 202 according to some embodiments of the invention. Application provider computer 202 may comprise a server computer 201(A) and a provisioning script database 201(H). The server computer 201(A) comprises a provisioning messaging module 201(B), a risk assessment module 201(C), a script execution module 201(D), an activation determination module 201(E), a mobile device interface 201(F), and a service provider interface 201(G).

Provisioning messaging module 201(B) may be configured to receive, generate, and send messages to mobile device 101 and service provider computer 202. For example, provisioning messaging module 201(B) may be configured to receive a request for provisioning from a mobile application on mobile device 101 and forward the request to service provider computer 202. Provisioning messaging module 201(B) may also be configured to receive confirmation from mobile device 101 that a script has been executed, send a partial personalization confirmation message to service provider computer 202. Provisioning messaging module 201(B) may also be configured to receive an activation message from service provider computer 202 when partial personalization and user authentication have been successfully completed, or a deletion message from service provider computer 202 when user authentication has failed.

Risk assessment module 201(C) may be configured to determine a level of risk associated with the user and/or mobile device 101. For example, risk assessment module 201(C) may be configured to perform a risk check based on the number of times mobile device 101 was previously provisioned, the number of times a user previously requested provisioning, a credit check for the user, or any other assessment method. In some embodiments, risk assessment module 201(C) may be configured to approve or decline the request for provisioning.

Script execution module 201(D) may be configured to initiate execution of provisioning scripts on mobile device 101. For example, script execution module 201(D) may send provisioning scripts to a mobile application on mobile device 101, so that the mobile application executes the provisioning scripts.

Activation determination module 201(E) may be configured to determine when activation of personalization data on mobile device 101 is to be conducted. For example, activation determination module 201(E) may determine if a partial personalization script has been successfully executed and if service provider computer 202 has successfully authenticated the user. If so, then activation determination module 201(E) may communicate script execution module 201(D) to initiate execution of an activation script on mobile device 101. Conversely, if activation determination module 201(E) determines that activation should not occur (e.g., because partial personalization was not conducted successfully or because the user was not authenticated), then activation determination module may communicate with script execution module 201(D) to initiate execution of a deletion script on mobile device 101.

Mobile device interface 201(F) may include any interface suitable to allow communication to and from mobile device 101. For example, mobile device interface 201(F) may implement an API using which mobile device 101 and application provider computer 201 may establish a client-server relationship. The API may define, for example, the format of a provisioning request message, the contents of a partial personalization script, activation script, and a deletion script, expected actions by mobile device 101 and application provider computer, etc.

Service provider interface 201(G) may include any interface suitable to allow communication to and from service provider computer 202. For example, service provider interface 201(G) may implement an API using which application provider computer 201 and service provider computer 202 may establish a client-server relationship. The API may define, for example, the format of a provisioning request message sent from application provider computer 201 to service provider computer 202, the contents of a message including provisioning scripts, and expected actions by application provider computer 201 and service provider computer 202.

Provisioning script database 201(H) may store provisioning scripts for mobile devices 101. In some embodiments, when application provider computer 201 receives a partial personalization script, an activation script, and a deletion script for a mobile device 101, application provider computer 201 stores the provisioning scripts in provisioning script database 201(H). Once script execution module 201 (D) determines that a provisioning script should be executed, the appropriate script may be retrieved from provisioning script database 201(H). The scripts may be retrieved in any suitable manner, such as using a user identifier, account identifier, or mobile device identifier.

Figure 5:
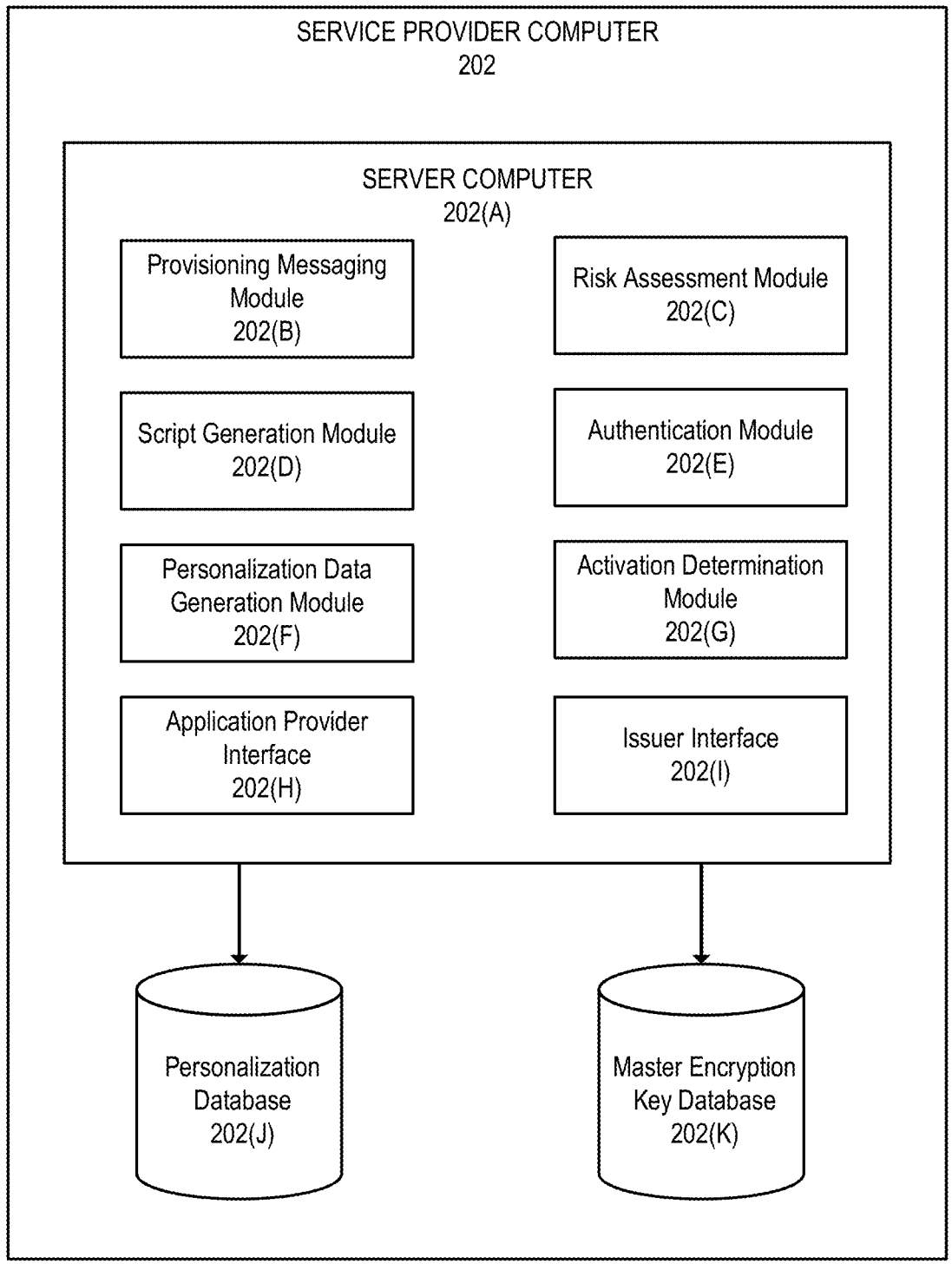
FIG. 5 shows an example of a service provider computer according to some embodiments of the invention.

FIG. 5 shows an example of a service provider computer 202 according to some embodiments of the invention. Service provider computer 202 may comprise a server computer 202(A), a personalization database 202(H), and a master key encryption database 202(K). The server computer 202(A) comprises a provisioning messaging module 202(B), a risk assessment module 202(C), a script generation module 202(D), an authentication module 202(E), a personalization data generation module 202(F), a activation determination module 202(G), an application provider interface 202(H), and an issuer interface 202(1).

Provisioning messaging module 202(B) may be configured to receive, generate, and send messages to service provider computer 202. For example, provisioning messaging module 202(B) may be configured to receive a request for provisioning from a service provider computer 202. Provisioning messaging module 201(B) may also be configured to receive confirmation from an authentication server 203 that a user is authentication and confirmation from an application provider computer 201 that a script has been executed. Provisioning messaging module 201(B) may also be configured to send an activation message to service provider computer 202 when partial personalization and user authentication have been successfully completed, or a deletion message from service provider computer 202 when user authentication has failed.

Risk assessment module 202(C) may be configured to determine a level of risk associated with the user and/or mobile device 101. For example, risk assessment module 202(C) may be configured to perform a risk check based on the number of times mobile device 101 was previously provisioned, the number of times a user previously requested provisioning, a credit check for the user, or any other assessment method. In some embodiments, risk assessment module 202(C) may be configured to approve or decline the request for provisioning.

Script generation module 202(D) may be configured to generate partial provisioning scripts, activation scripts, and deletion scripts. The generated scripts may be in any suitable format. In some embodiments, script generation module 202(D) may determine an appropriate format for the provisioning scripts before generating the scripts. For example, if mobile device 101 relates to an EMV device, script generation module 202(D) may generate a script in accordance with the EMV Personalization Specification. The script generation itself may be performed in any suitable manner. For example, in some embodiments, scripts may be generated programmatically using storing, encryption, decryption, and other commands as appropriate for mobile device 101. Script generation module 202(D) may also communicate with personalization database 202(J) and personalization data generation module 202(F) to determine personalization data to be stored using a partial personalization script.

Authentication module 202(E) may be configured to authenticate a user, mobile device 101, or another entity. For example, in some embodiments, a request for provisioning message may include a cryptogram associated with a user's payment account. In order to authenticate the user, authentication module 202(E) may verify the cryptogram using device information provided in the request for provisioning, personalization database 202(J), and/or a master encryption key stored in master encryption key database 202(K). Authentication module 202(E) may also communicate with authentication server 203 to perform further authentication of a user or mobile device 101.

Personalization data generation module 202(F) may be configured to generate personalization data for a provisioning request. In some cases, generating personalization data may involve retrieving corresponding data from personalization database 202(J) and formatting the data to be used in a provisioning script. In other cases, generating personalization data may involve generation a payment token using a tokenization algorithm.

Activation determination module 202(G) may be configured to determine if mobile device 101 is ready to be activate. In some embodiments, activation determination module 202(G) may determine that a partial personalization confirmation message has been received for a mobile device 101, and that authentication server 203 has authenticated the user corresponding to the mobile device 101. Activation determination module 202(G) may then determine that mobile device 101 is ready to be activated. Accordingly, activation determination module 202(G) may cause provisioning messaging module 202(B) to send an activation message to application provider computer 201.

Application provider interface 202(H) may include any interface suitable to allow communication to and from application provider computer 201. For example, application provider interface 202(H) may implement an API using which application provider computer 201 and service provider computer 202 may establish a client-server relationship. The API may define, for example, the format of a provisioning request message sent from application provider computer 201 to service provider computer 202, the contents of a provisioning script message including provisioning scripts, and expected actions by application provider computer 201 and service provider computer 202.

Issuer interface 202(1) may include any interface suitable to allow communication to and from issuer computer 106. For example, issuer interface 202(1) may implement an API using which service provider computer 202 and issuer computer 106 may establish a client-server relationship. The API may define, for example, the format of a token linkage message sent from service provider computer 202 to issuer computer 106.

Personalization database 202(J) may store any suitable information regarding users, accounts, mobile devices, and personalization data for the users, accounts, and mobile devices. For example, personalization database 202(J) may include user authentication data that allows service provider computer 202 to authenticate a user. Examples of user authentication data may include a primary account number (PAN) of an account associated with a user, a password, and a digital certificate.

Master encryption key database 202(K) may store any encryption keys by which a cryptogram or other data may be decrypted or verified. For example, in some embodiments, each issuer, payment processing network, or device manufacturer may be associated with a different secret encryption key. Thus, if user authentication information provided in a request for provisioning includes a cryptogram, the appropriate master encryption key may be required to decrypt and validate the cryptogram. In some embodiments, user, device, or account information may be used to determine an appropriate master encryption key to retrieve from database 202(K) In some embodiments, the master key may be used to derive a specific key in order to verify the cryptogram.

III. Provisioning Methods

Figure 6:
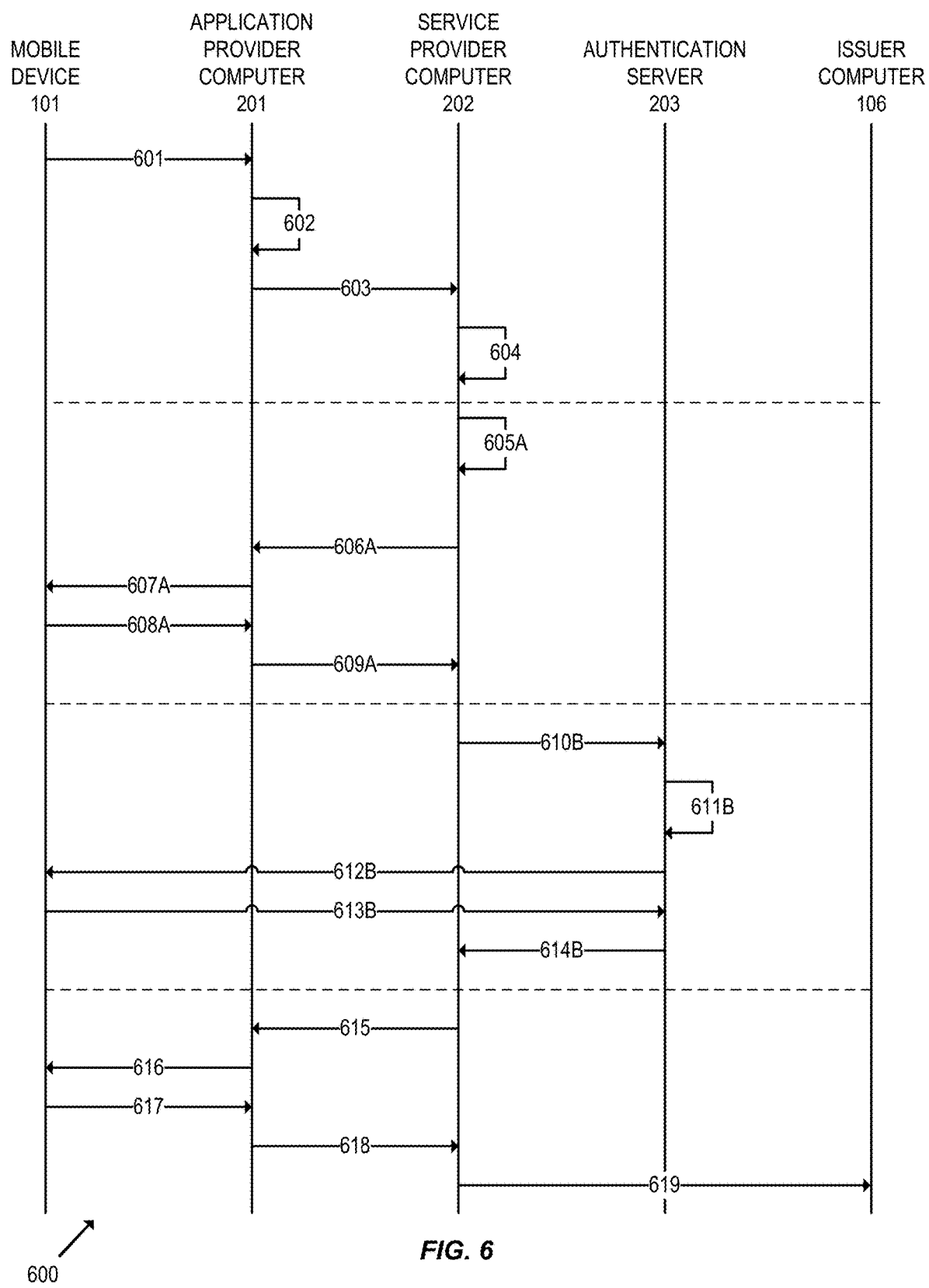
FIG. 6 shows a communication flow diagram of a method to provision a mobile device using a partial personalization script.

FIG. 6 shows a communication flow diagram of a method 600 to provision a mobile device using a partial personalization script. As shown in FIG. 6, method 600 may include mobile device 101, application provider computer 201, service provider computer 202, authentication server 203, and issuer computer 106.

At step 601, sends a request for provisioning of a mobile application running on mobile device 101. For example, in a digital wallet application, the user may request provisioning of an account, credit card, or any other payment credentials for mobile device 101. The request for provisioning message may include device information such as a device 101 identifier, secure element 106(G) identifier, a secure element key identifier, a user identifier (to identify a user or account), and user authentication information (e.g., a cryptogram such as a CVV2 for card verification based authentication processes and a ZIP code for geographic verification).

At step 602, application provider computer 201 receives the request for provisioning message and performs a risk check or risk analysis for the requesting user, account, mobile device 101, or any other data that is present in the received request for provisioning message, or is tied to a user's account associated with the request for provisioning message. For example, in some embodiments, the risk check may involve determining how many times the user's account has been provisioned and how many accounts are provisioned on mobile device 101. In some embodiments, risk assessment module 201(C) may be used to perform the risk check. The risk check may, for example, indicate the likelihood that the request for provisioning is fraudulent.

At step 603, if the risk check indicates that the risk of provisioning is acceptable, then application provider computer 201 sends the request for provisioning to server provider computer 202. The request for provisioning message may include any of the information included in the message received from mobile device 101, and may include additional information determined by application provider computer, such as a primary account number (PAN) associated with the user's account and a reference number associated with the request for provisioning.

At step 604, service provider computer 202 attempts to verify the provided user authentication information. In one embodiment, if the request for provisioning included a PAN and a cryptogram, service provider computer 202 may retrieve a master encryption key from master encryption key database 202(K), use the master encryption key to decrypt the cryptogram, and ensure that the decrypted value is an expected value (e.g., corresponding to received value of the PAN).

The following steps 605A-609A, relating to the generation of provisioning scripts and the execution of a partial personalization script on mobile device 101 may be performed concurrently with steps 610B-614B, which relate to authentication of the user. Although the steps are described in numeric sequence, any of the "A" steps may be performed in parallel with any of the "B" steps, and vice versa.

At step 605A, service provider computer 202 generates a payment token to provision onto the mobile device. The payment token represents a PAN or other account number to be provisioned on the mobile device. The payment token may be the actual PAN provided in the provisioning request, may be a generated token, the PAN plus a PAN sequence number, a method of PAN identification, or any other potential payment information to identify the account when used through the mobile payment application. Step 605 may call any number of payment processing network 105 systems in order to obtain an appropriate PAN, tie the PAN to the relevant account, etc. The payment token may be included in the personalization data later stored onto the device.

At step 606A, service provider computer 202 generates a partial personalization script, an activation script, and a deletion script, and sends the provisioning scripts to application provider computer 201 in a provisioning script message. As described earlier, the partial personalization script may be operable to store personalization data onto mobile device 101. The activation script may be operable to activate or enable access to the personalization data. The deletion script may be operable to delete or otherwise remove the personalization data from mobile device 101. The provisioning script message may also include device information (which may help application provider computer 201 identify which mobile device 101 is associated with the provisioning scripts), a reference identifier (for a similar purpose), and card art (which may be provided to mobile device 101 as a graphical representation of the account to be provisioned). In some embodiments, the provisioning scripts may be encrypted such that only mobile device 101 or the secure element 101(G) of mobile device 101 may decrypt the scripts. One method 800 of generating encrypted provisioning scripts is described in FIG. 8. Once step 606A is completed, in some embodiments, service provider computer 202 may delete any personalization data residing on service provider computer 202.

At step 607A, once the provisioning message is received by application provider computer 201, application provider computer 201 initiates execution of the partial personalization script on mobile device 101. The execution may be initiated by, for example, sending to mobile device 101 a partial personalization script message comprising the partial personalization script and instructions to execute the script. Once received, a mobile application, secure element interface 101(F), or another suitable element in mobile device 101 may cause processor 101(A) to execute the partial personalization script.

In some embodiments, application provider computer 201 may also associate the provisioning scripts with a user account or mobile device 101 in a provisioning script database 201(H). In some embodiments wherein the provisioning scripts are encrypted, application provider computer 201 is not able to read the provisioning scripts. In such embodiments, mobile device 101 may decrypt the provisioning scripts (e.g., using a secret key stored on mobile device 101).

At step 608A, mobile device 101 sends to application provide computer 201 a partial personalization confirmation message indicating whether the partial personalization script was successfully installed. At step 609A, the partial personalization confirmation message may be forwarded to service provider computer 202. The partial personalization confirmation message may include device information and a reference identifier.

Concurrently to steps 605A-609A, method 600 may involve authenticating the user at steps 610B-614B. At step 610B, service provider computer 202 sends an authentication request message to authentication server 203. The authentication request message may include user authentication information user authentication information provided by mobile device 101 or application provider computer 201, such as a primary account number (PAN). The authentication request message may also include a reference identifier and device information.

At step 611B, authentication server 203 conducts a further risk assessment and authentication process and determines whether the user is authenticated and authorized to provision mobile device 101. The further risk assessment and authentication process may involve detailed checks such as whether the user's account was previously flagged as compromised or an analysis of past transactions.

In some cases, authentication server 203 may determine at step 611B that the user is authenticated or is not authenticated. In such cases, the method may proceed directly to step 614B. In other cases, authentication server 203 may require additional information. In such cases, at step 612B, authentication server 203 may send an authentication request message to mobile device 101 requesting additional user authentication data. In response, at step 613B, the user may enter the requested information into mobile device 101, and mobile device 101 may send an authentication response message to authentication server 203. Examples of additional user authentication information may include challenge/response questions, security questions, one time passwords, etc.

At step 614B, authentication server 203 determines whether the user is authenticated and sends an authentication result message to service provider computer 202 indicating whether the user is or is not authenticated.

Once service provider computer 202 receives a partial personalization confirmation message (at step 609A) and an authentication result message (at step 614B), at step 615, service provider computer 202 either sends an activation message or a deletion message to application provider computer 201. Typically, service provider computer 202 may send an activation message if the partial personalization confirmation message indicates a successful execution of the script and the authentication result message indicate successful authentication. Conversely, service provider computer 203 may send a deletion message if either the partial personalization confirmation message or authentication result message indicate failure. The activation message and deletion message typically include device information and a reference identifier to allow application provider computer 201 to determine the corresponding mobile device 101. However, in some embodiments, the activation and deletion messages do not include any personalization data.

At step 616, application provider computer 201 either initiates execution of the activation script or the deletion script, depending on whether an activation message or deletion message was received, respectively. In some embodiments, initiating execution of the activation script and the deletion script may be performed in a similar manner to initiation of the partial personalization script. For example, application provider computer 201 may send the activation script or deletion script to mobile device 101, and mobile device 101 may subsequently execute the activation script or deletion script (e.g., using processor 101(A)).

Alternatively, in some embodiments, the activation script and deletion script may be loaded onto mobile device 101 before step 616. For example, the activation script and deletion script may be transmitted to mobile device 101 at step 607A, but not executed at that time. In such embodiments, initiating execution of the activation script or deletion script may include sending a message to mobile device 101 instructing mobile device 101 to execute the appropriate script. In some embodiments, the message may comprise secret data such as an encryption key that allows the appropriate script to be executed on mobile device 101.

At step 617, mobile device 101 sends a provisioning confirmation message to application provider computer 201 indicating whether the activation or deletion was successfully performed.

At step 618, application provider computer 201 returns the confirmation to service provider computer 202. Upon successful verification that the account has been provisioned and activated on the device, service provider computer 202 may fully activate the account provisioned on the account and inform issuer computer 106 of such an activation. For example, at step 619, if a payment token was previously generated for the payment account, service provider computer 202 may send a token linkage message comprising the payment token and the account PAN to issuer computer 106 instructing the token and PAN to be linked.

In some cases, user authentication or another process may take sufficiently long for a session key used in provisioning scripts to time out. In such embodiments, it may be necessary to reestablish a secure session between mobile device 101, application provider computer 201, and service provider computer 202 in order to complete provisioning (e.g., to execute an activation script or a deletion script).

Figure 7:
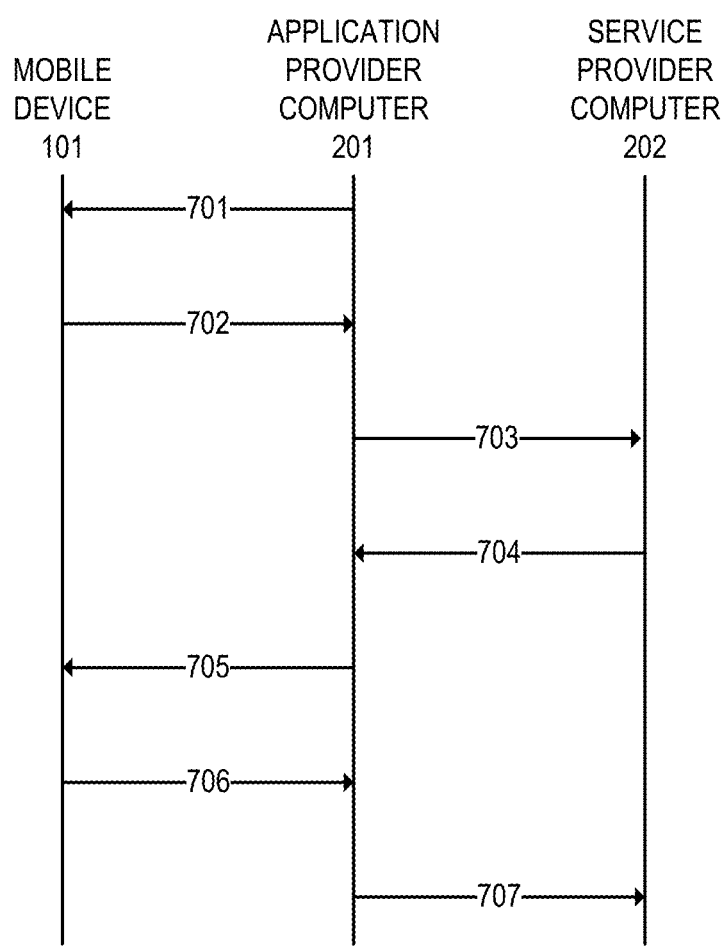
FIG. 7 shows a communication flow diagram of a method to reestablish a session between a mobile device and a service provider computer.

FIG. 7 shows a communication flow diagram of a method 700 to reestablish a session between a mobile device and a service provider computer.

At step 701, application provider computer 201 sends a request to establish a new session to mobile device 101.

In response, at step 702, mobile device computer 101 transmits a nonce or other data element to application provider computer 201.

At step 703, application provider computer 201 transmits a request to service provider computer 202 for either an activation script or a deletion script (as determined by service provider computer 202). The request may include the nonce or data element provided by mobile device 101, device information associated with mobile device 101, and a reference identifier.

At step 704, service provider computer 202 uses the device information and nonce or data element to generate a new session key. The service provider computer 202 then re-generates the appropriate script (e.g., an activation script or deletion script), depending on the success of authentication and partial personalization, and encrypts the generated script with the new session key. The service provider computer 202 sends the encrypted script to application provider computer 201.

At step 705, application provider computer 201 initiates execution of the received script on mobile device 101. Once the script has been executed, mobile device 101 sends a provisioning confirmation message indicating whether provisioning was successful or not. At step 706, application provider computer 201 forwards the provisioning confirmation message to service provider computer 202.

Figure 8:
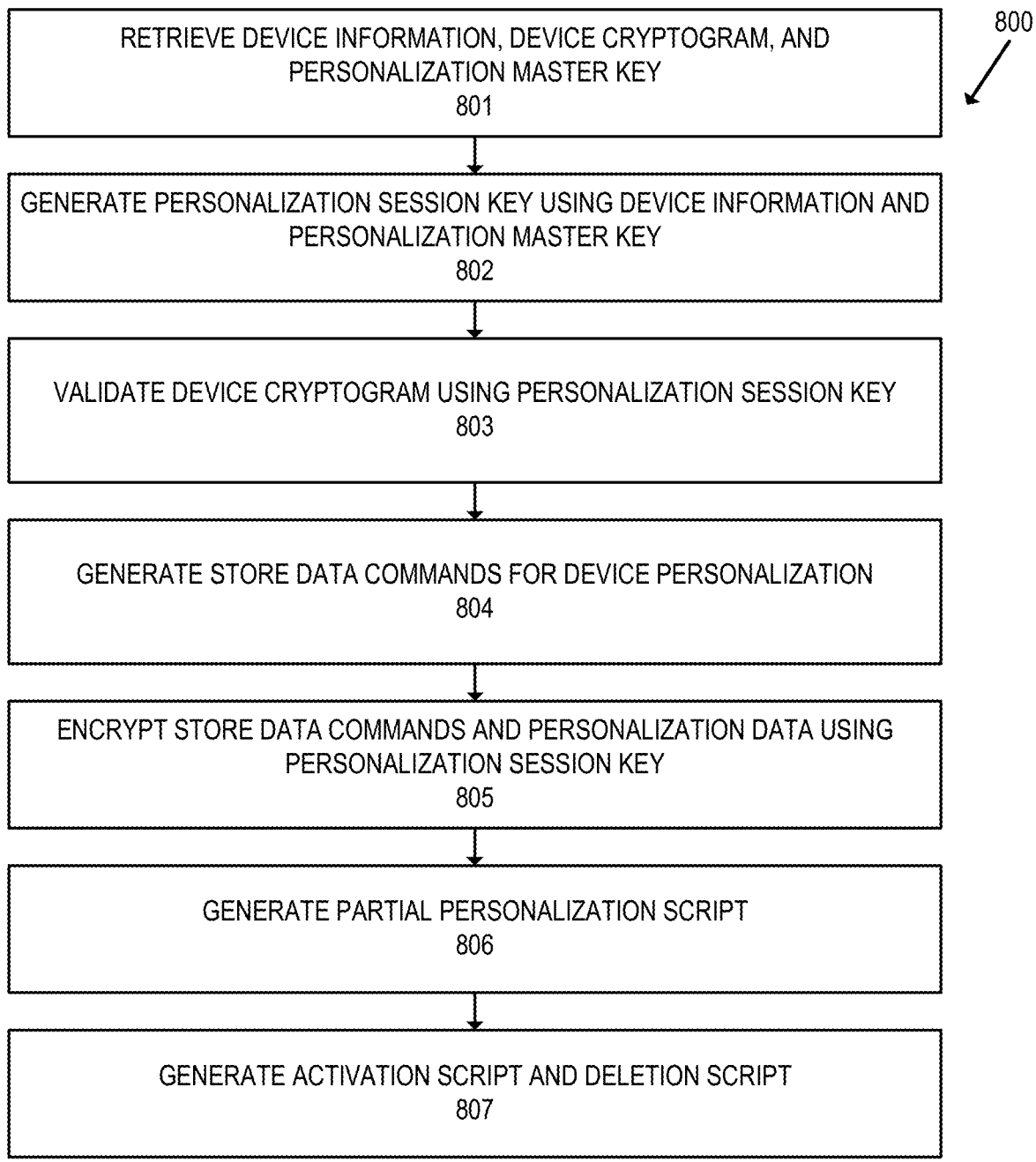
FIG. 8 shows a method of generating a partial personalization script, an activation script, and a deletion script.

FIG. 8 shows a method 800 of generating a partial personalization script, an activation script, and a deletion script. Typically, the method of FIG. 8 may be performed by a service provider computer 202, but may alternatively be performed by any other suitable entity. In some embodiments, method 800 may be performed as a part of step 606A of method 600.

At step 801, device information, a device cryptogram, and a personalization master key are determined for a mobile device 101 to be provisioned. For example, if method 800 is performed at step 606A of method 600, the device information and device cryptogram may be determined from the request for provisioning received by service provider computer 202 at step 603. In some embodiments, the personalization master key may be retrieved from a master key encryption database 202(K).

A "personalization master key" may include any symmetric or asymmetric encryption key that is associated with a user or device. Typically, the personalization master key may be used to derive an encryption key associated with a secure element 101(G) on mobile device 101. For example, in some embodiments, an encryption key associated with secure element 101(G) may be derived using a function KDF(K,I), where KDF is a key derivation function, K is a personalization master key associated with secure element 101(G), and I is a unique identifier associated with secure element 101(G). In various embodiments, the personalization master key may be associated with the manufacturer of the secure element, the issuer of the user account, the payment processing network 106, or another entity. Typically, the device information included in the request for provisioning may include a secure element identifier suitable to identify and retrieve the appropriate personalization master key.

At step 802, a personalization session key is generated using the retrieved personalization master key and device information. In some embodiments, the personalization session key may be generated using a nonce or other unique session identifier included in the device information and the personalization master key.

At step 803, the device cryptogram is validated using the personalization session key. Validating the device cryptogram may comprise decrypting the cryptogram and ensuring the result matches an expected value.

At step 804, store data commands are generated for device personalization. The store data commands may be in any suitable language or format. Typically, the store data commands are formatted to be readable by mobile device 101 or secure element 101(G). The store data commands may comprise personalization data, such as data determined from personalization database 202(J).

At step 805, the store data commands are encrypted using the personalization session key. At step 806, the partial personalization script is generated using the encrypted store data commands.

At step 807, the activation script and deletion script are generated. In some embodiments, the activation and deletion scripts are also encrypted using the personalization session key.

In some embodiments, mobile device 101 may decrypt the provisioning scripts using the personalization session key used to generate the cryptogram.

IV. Computer Apparatus

Figure 9:
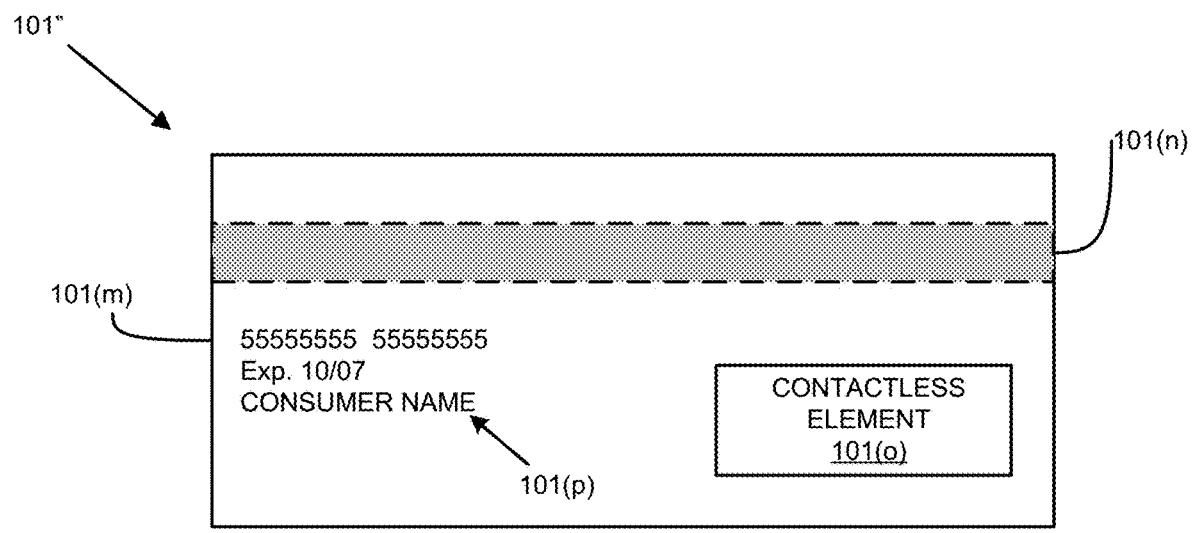
FIG. 9 shows an example of a payment device.

FIG. 9 shows an example of a payment device 101" in the form of a card. As shown, the payment device 101" comprises a plastic substrate 101(m). In some embodiments, a contactless element 101(o) for interfacing with an access device 102 may be present on, or embedded within, the plastic substrate 101(m). User information 101(p) such as an account number, expiration date, and/or a user name may be printed or embossed on the card. A magnetic stripe 101(n) may also be on the plastic substrate 101(m). In some embodiments, the payment device 101" may comprise a microprocessor and/or memory chips with user data stored in them.

As noted above and shown in FIG. 9, the payment device 101" may include both a magnetic stripe 101(n) and a contactless element 101(o). In some embodiments, both the magnetic stripe 101(n) and the contactless element 101(o) may be in the payment device 101". In some embodiments, either the magnetic stripe 101(n) or the contactless element 101(o) may be present in the payment device 101".

FIG. 10 is a high level block diagram of a computer system that may be used to implement any of the entities or components described above. The subsystems shown in FIG. 10 are interconnected via a system bus 1075. Additional subsystems include a printer 1003, keyboard 1006, fixed disk 1007, and monitor 1009, which is coupled to display adapter 1004. Peripherals and input/output (I/O) devices, which couple to I/O controller 1000, can be connected to the computer system by any number of means known in the art, such as a serial port. For example, serial port 1005 or external interface 1008 can be used to connect the computer apparatus to a wide area network such as the Internet, a mouse input device, or a scanner. The interconnection via system bus 1075 allows the central processor 1002 to communicate with each subsystem and to control the execution of instructions from system memory 1001 or the fixed disk 1007, as well as the exchange of information between subsystems. The system memory 1001 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer-implemented method comprising:
receiving, by a processor of a service provider computer, a request for provisioning a computing device, the request including device information for the computing device and user authentication information for a user of the computing device, the device information including a secure element identifier and a session identifier;
retrieving, by the processor, a personalization master key associated with the computing device based on the secure element identifier;
generating, by the processor, a personalization session key using a key derivation function, the secure element identifier, the session identifier, and the personalization master key;
generating, by the processor, store data commands comprising personalization data;
encrypting, by the processor, the store data commands using the personalization session key;
generating, by the processor, a partial personalization script using the encrypted store data commands;
generating, by the processor, an activation script;
encrypting, by the processor, the activation script using the personalization session key;
generating, by the processor, a deletion script used for deletion of personalization data residing on the computing device;
encrypting, by the processor, the deletion script using the personalization session key; and
sending, by the processor, the partial personalization script and the activation script and the deletion script to the computing device, wherein the computing device decrypts the store data commands, the activation script, and the deletion script using an encryption key that matches the personalization session key.

2. The computer-implemented method of claim 1, wherein the session identifier is a nonce value.

3. The computer-implemented method of claim 1, wherein the personalization master key is a symmetric encryption key.

4. The computer-implemented method of claim 1, further comprising:
determining, by the processor, that the personalization session key is expired;
establishing, by the processor, a new session associated with a new personalization session key;
generating, by the processor, a new activation script using the new personalization session key; and
sending, by the processor, the new activation script.

5. The computer-implemented method of claim 1, wherein the device information includes a device cryptogram.

6. The computer-implemented method of claim 5, further comprising authenticating the user by validating the device cryptogram using the personalization session key.

7. The computer-implemented method of claim 1, wherein the user authentication information includes an account identifier, and wherein the personalization data includes a token that represents the account identifier.

8. The computer-implemented method of claim 1, wherein the request does not include the personalization master key, and wherein the personalization master key is not sent between the computing device and the service provider computer.

9. The computer-implemented method of claim 1, wherein the personalization master key is associated with an issuer of a user account or a manufacturer of a secure element associated with the secure element identifier.

10. The computer-implemented method of claim 1, wherein the partial personalization script includes a script operable to store the personalization data on the computing device.

11. A service provider computer comprising:
a processor;
a non-transitory computer-readable medium comprising code executable by the processor for implementing operations including:
receiving a request for provisioning a computing device, the request including device information for the computing device and user authentication information for a user of the computing device, the device information including a secure element identifier and a session identifier;
retrieving a personalization master key associated with the computing device based on the secure element identifier;
generating a personalization session key using a key derivation function, the secure element identifier, the session identifier, and the personalization master key;
generating store data commands comprising personalization data;
encrypting the store data commands using the personalization session key;
generating a partial personalization script using the encrypted store data commands;
generating an activation script;
encrypting the activation script using the personalization session key;
generating a deletion script used for deletion of personalization data residing on the computing device;
encrypting the deletion script using the personalization session key; and
sending the partial personalization script and the activation script and the deletion script to the computing device, wherein the computing device decrypts the store data commands, the activation script, and the deletion script using an encryption key that matches the personalization session key.

12. The service provider computer of claim 11, wherein the session identifier is a nonce value.

13. The service provider computer of claim 11, wherein the personalization master key is a symmetric encryption key.

14. The service provider computer of claim 11, wherein the operations further comprises:
determining that the personalization session key is expired;
establishing a new session associated with a new personalization session key;
generating a new activation script using the new personalization session key; and
sending the new activation script.

15. The service provider computer of claim 11, wherein the device information includes a device cryptogram.

16. The service provider computer of claim 15, wherein the operations further comprises authenticating the user by validating the device cryptogram using the personalization session key.

17. The service provider computer of claim 11, wherein the user authentication information includes an account identifier, and wherein the personalization data includes a token that represents the account identifier.

* * * * *